United States Patent [19]

Hanson

[11] Patent Number: 4,537,524

[45] Date of Patent: Aug. 27, 1985

[54] BALL AND SOCKET JOINT

[75] Inventor: William M. Hanson, Leamington Spa, England

[73] Assignee: Automotive Products plc, Leamington Spa, England

[21] Appl. No.: 599,329

[22] Filed: Apr. 12, 1984

[30] Foreign Application Priority Data

Apr. 16, 1984 [GB] United Kingdom ............. 8310345

[51] Int. Cl.³ .......................................... F16C 11/06
[52] U.S. Cl. .................................. 403/140; 403/135
[58] Field of Search ............................. 403/140, 135

[56] References Cited

U.S. PATENT DOCUMENTS

| 3,226,141 | 12/1965 | Sullivan | 403/135 |
| 3,530,495 | 9/1970 | Kindel | 403/140 |
| 3,909,084 | 9/1975 | Snider | 403/135 X |
| 3,953,139 | 4/1976 | Uchida | 403/140 |

FOREIGN PATENT DOCUMENTS 1198365 7/1970 United Kingdom .
1318307 5/1973 United Kingdom .
1323047 7/1973 United Kingdom .

Primary Examiner—Andrew V. Kundrat
Attorney, Agent, or Firm—Kemon & Estabrook

[57] ABSTRACT

A ball and socket joint is of the type in which a ball pin is supported by a bearing insert retained within a housing. The bearing insert has axial slots in one end which upon assembly of the joint allow the insert to be deformed in a more consistant manner. An annular groove in one end of the insert defines two thin lips one of which upon assembly is deformed to provide a preload to the joint.

12 Claims, 4 Drawing Figures

BALL AND SOCKET JOINT

This invention relates to ball and socket joints of a type that is well known (UK Pat. No. 1,323,047) in which a bearing member or insert of a resilient material such as acetal resin or nylon is held within the cavity of a cup shaped socket formed in a housing. The bearing insert in such a ball and socket joint forms a part-spherical bearing surface by partially enclosing the ball of the ball pin, the ball pin having a shank which extends through an aperture in the base of the cup shaped socket.

One problem with ball joints of this type is that to insert the ball pin and bearing sub-assembly into the cavity formed in the bearing housing requires the bearing insert to experience a severe deformation.

To produce this deformation a large assembly force is required, and this makes the prediction and control of the bearing preload difficult in a production environment. If the preload is too great the bearing friction will be too large; if the preload is not enough movement of the ball pin relative to the bearing housing may develop very rapidly.

An object of this invention is to reduce the force required to assemble such a ball joint and enable ball joints to be manufactured with a more consistant level of preload.

According to this invention there is provided a ball and socket joint comprising a housing having a substantially cup-shaped cavity, a ball pin, the shank of which passes through an aperture in the housing and a bearing insert of a resilient material retained within the housing and partially enclosing the part-spherical head of the ball pin, the bearing insert having a thickened end portion which before assembly has an outside diameter which is greater than the internal diameter of the co-operating portion of the housing and has a cylindrical bore of substantially the same diameter as the part-spherical head of the ball pin wherein the thickened end portion has axial slots extending from its end face.

Preferably the axial slots become wider towards the end face of the thickened end portion.

Preferably the thickened end portion has an annular groove in the end face defining inner and outer lips.

Conveniently it is also provided that the bearing insert is retained by a bearing end cap secured in the mouth of the housing which abuts a shoulder formed in said housing.

Preferably before insertion of the bearing end cap into the housing the outer lip of the thickened end portion protrudes axially beyond the shoulder in the housing, the outer lip being compressed by the end cap when said cap is secured in place.

One embodiment of this invention will now be described by way of example and with reference to the accompanying drawings of which:

Figure 1:
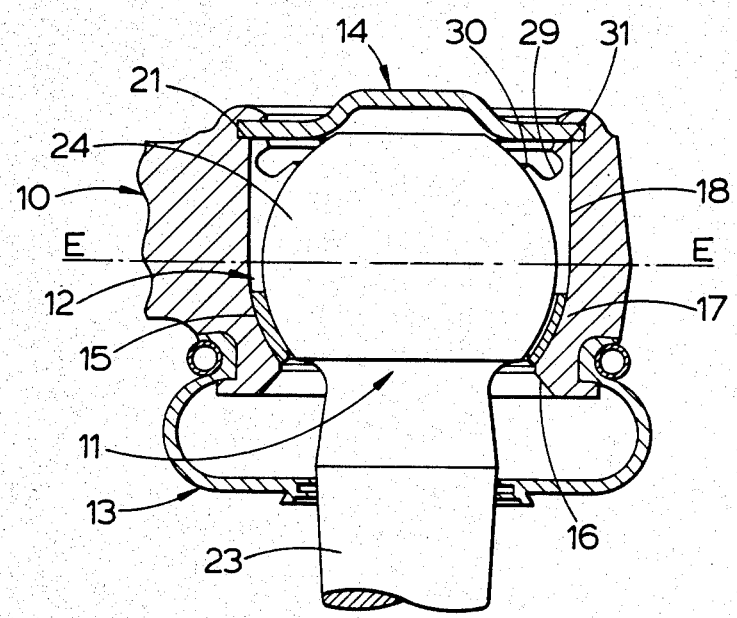
FIG. 1 is a transverse section of first embodiment of an assembled ball and socket joint according to the invention.

The ball and socket joint shown in FIG. 1 comprises a housing 10, a ball pin 11, a bearing insert 12, a flexible boot 13 and an end cap 14. The housing 10 has a substantially cup shaped cavity 15, said cavity 15 having an aperture 16 in its base portion 17 which is of a truncated spherical form and two cylindrical portions 18 and 19. Cylindrical portion 19 is in the mouth 22 of the cavity 15 and is of a larger diameter than cylindrical portion 18. A shoulder 21 separates the cylindrical portions 18 and 19.

The ball pin 11 has a shank 23 which passes through the aperture 16 in the base of the cavity 15 and is sealed to the housing 10 by a flexible boot 13 to prevent the ingress of debris, and a part-spherical head 24 the surface of which co-operates with the inner surface of the bearing insert 12. The bearing insert 12 is of acetal resin, being a low friction abrasion resistant material having sufficient resilience to permit assembly as described below.

Figure 2:
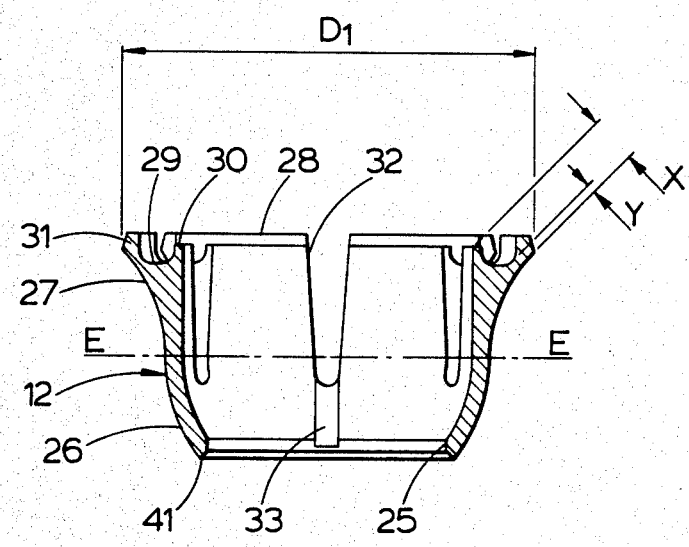
FIG. 2 is a transverse section of a resilient bearing insert of the ball and socket joint shown in FIG. 1 in a pre-assembled condition.

FIG. 2 shows the bearing insert 12 before assembly. It is substantially cup shaped, having an aperture 25 in a truncated spherical base portion 26 to allow the passage of the ball pin shank 23 and a thickened end portion 27. The thickened end portion 27 has an end face 28 and a cylindrical bore of substantially the same diameter as that of the ball portion 24 of the ball pin 11 and a flared outer surface. The flared outer surface of the thickened end portion 27 is of substantially the same diameter as that of the diameter $D_2$ of the co-operating portion 18 of the housing 10 at its equator E—E and increases to a diameter $D_1$ of greater diameter than the diameter $D_2$ towards the end face 28. The end face 28 has an annular groove 29 which defines two lips, an inner lip 30 and an outer lip 31. Six tapered axial slots 32 extend from the end face 28 to a position at or beyond the equator E—E, the slots 32 becoming wider towards the end face 28 than at the equator E—E. Alternate slots connect with shallow grease grooves 33 in the inner surface of the bearing insert, extending to the end of the rim 41 of the base portion 26.

To assemble the joint the ball portion 24 of the ball pin 11 is placed in to the bearing insert 12 to form a bearing sub-assembly. For convenience the bearing insert 12 maybe slightly deformed by this operation causing it to loosely grip the ball portion 24 of the ball pin 11. This allows the bearing sub-assembly to be more easily handled. The bearing sub-assembly is then inserted into the housing 10, the bearing insert 12, in particular the thickened end portion 27, undergoing deformation resulting in a reduction in the diameter of said thickened end portion from $D_1$ to $D_2$.

Figure 3:
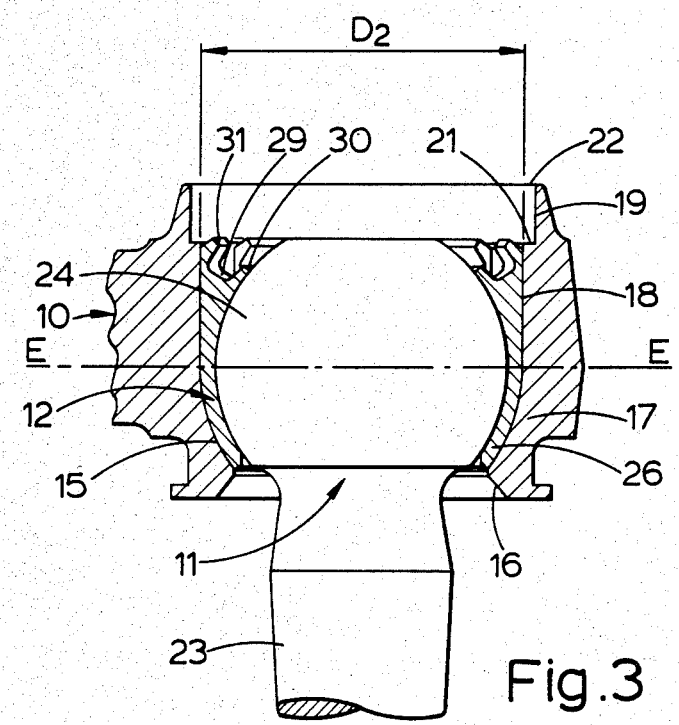
FIG. 3 is a transverse section of the ball and socket joint shown in FIG. 1 in a partially assembled condition.

FIG. 3 illustrates the relative positions of the housing 10, the ball pin 11 and the bearing insert 12 before insertion of the end cap 14. The outer lip 31 of the bearing insert 12 protrudes beyond the shoulder 21. The end cap 14 is then inserted into the mouth 22 of the housing 10 with sufficient force to compress the outer lip 31 of the bearing insert 12 and allow the end cap 14 to abut the shoulder 21. In so doing the end cap 14 provides a further preload to the assembled ball joint. The mouth 22 of the housing 10 is then peened inwardly to secure the bearing end cap 14 and so maintain the bearing preload.

By increasing the width of the slots 32 towards the end face 28, adequate bearing surface area and strength are retained in the portion adjacent to the equator E—E. The tapered form of the slots 32 also assists moulding and if a linear taper is used as shown this simplifies the tooling of the mould.

The shoulder 21 obviates the need to closely control the force on the end cap 14 during assembly and allows the mouth to be peened without altering the bearing preload.

Figure 4:
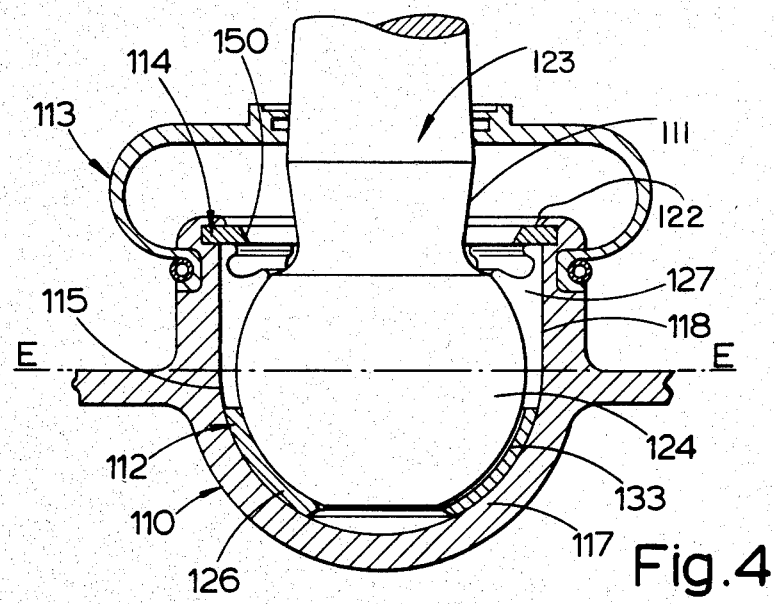
FIG. 4 is a transverse section of a second embodiment of an assembled ball and socket joint according to the invention.

In the second embodiment of the invention shown in FIG. 4 many parts of the ball and socket joint are similar or modifications of those described with respect to FIGS. 1-3, so that where appropriate the same reference numerals are used with the addition of 100 and only the differences and modifications will be described.

The housing 110 has a substantially cup shaped cavity 115 having a part-spherical base portion 117 and a cylindrical portion 118.

In this embodiment the shank 123 of the ball pin 111 passes through the aperture formed by the mouth 122 of the cavity 115 and an aperture 150 in the end cap 114.

The bearing insert 112 is substantially identical to the insert 12 described above except that the base portion 126 is elongated to provide a greater bearing area. This form of ball and socket joint is more suitable for a motor vehicle suspension application in which a compressive load is applied through the ball pin shank 123.

Compared with known ball and socket joints which do not have the slots 32, the force required to produce this deformation is reduced by the presence of the axial slots 32. This is helped by the annular groove 29, it being easier to deform material of thickness X than material of thickness Y.

I claim:

1. A ball and socket joint comprising:
   a ball pin having a shank and a part-spherical head;
   a housing defining a substantially cup-shaped cavity including a cylindrical bore portion and an aperture, the shank of the ball pin extending through said aperture;
   a bearing insert of a resilient material within said cavity and partially enclosing the part-spherical head of the ball pin and including a truncated spherical base portion, a thickened end portion which before insertion into the housing has a flared outer surface, an end face, an internal cylindrical surface and slots in the thickened end portion extending axially from the end face, said thickened end portion being deformed during assembly such that the flared outer surface after assembly conforms to the cylindrical bore portion of the housing and the internal cylindrical surface conforms to the part-spherical head of the ball pin; and retainer means in the housing for retaining the bearing insert.

2. A ball joint according to claim 1 in which said axial slots become wider towards the end face of the thickened end portion.

3. A ball joint according to claim 2 in which said retainer means comprises a shoulder formed in the mouth of said cavity and an end cap secured in the mouth against the shoulder.

4. A ball joint according to claim 3 in which the thickened end portion is held in compression by the end cap.

5. A ball and socket joint comprising:
   a ball pin having a shank and a part-spherical head;
   a housing defining a substantially cup shaped cavity including a cylindrical bore portion and an aperture, the shank of the ball pin extending through said aperture;
   a bearing insert of a resilient material within said cavity and partially enclosing the part-spherical head of the ball pin and including a truncated spherical base portion, a thickened end portion which before insertion into the housing has a flared outer surface, an end face having an annular groove defining inner and outer lips, an internal cylindrical surface and slots in the thickened end portion extending axially from the end face, said end portion being deformed during assembly such that the flared outer surface after assembly conforms to the cylindrical bore portion of the housing and the internal cylindrical surface conforms to the part-spherical head of the ball pin, and that the outer lip is subjected to inwardly directed elastic bending; and retainer means in the housing for retaining the bearing insert.

6. A ball and socket joint according to claim 5 in which said retainer means comprises a shoulder formed in the mouth of said cavity and an end cap secured in the mouth against the shoulder.

7. A ball and socket joint according to claim 6 in which before insertion of the end cap into the mouth of the cavity the outer lip of the thickened end portion protrudes beyond the shoulder.

8. A ball and socket joint according to claim 7 in which the outer lip of said thickened end portion is held in a deformed state by the secured end cap.

9. A ball and socket joint comprising:
   a ball pin having a shank and a part-spherical head;
   a housing defining a substantially cup shaped cavity including a cylindrical bore portion and an aperture, the shank of the ball pin extending through said aperture;
   a bearing insert of a resilient material within said cavity and partially enclosing the part-spherical head of the ball pin and including a truncated spherical base portion, a thickened end portion having an end face and an annular groove in the end face defining inner and outer lips, the thickened end portion having, before insertion into the housing, a flared outer surface and an internal cylindrical surface, said end portion being deformed during assembly such that the flared outer surface conforms to the cylindrical bore portion of the housing and the internal cylindrical surface conforms to the part-spherical head of the ball pin, and that the outer lip is subjected to inwardly directed elastic bending; and retainer means in the housing for retaining the bearing insert.

10. A ball and socket joint according to claim 9 in which said retainer means comprises a shoulder formed in the mouth of said cavity and an end cap secured in the mouth against the shoulder.

11. A ball and socket joint according to claim 10 in which before insertion of the end cap into the mouth of the cavity the outer lip of the thickened end portion protrudes beyond the shoulder.

12. A ball and socket joint according to claim 11 in which the outer lip of said thickened end portion is held in a deformed state by the secured end cap.

* * * * *